United States Patent
Inoshita

(10) Patent No.: US 12,307,707 B2
(45) Date of Patent: May 20, 2025

(54) OBJECT RECOGNITION DEVICE, OBJECT RECOGNITION METHOD, AND RECORDING MEDIUM

(71) Applicant: NEC Corporation, Tokyo (JP)

(72) Inventor: Tetsuo Inoshita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 204 days.

(21) Appl. No.: 18/019,431

(22) PCT Filed: Aug. 14, 2020

(86) PCT No.: PCT/JP2020/030837
§ 371 (c)(1),
(2) Date: Feb. 2, 2023

(87) PCT Pub. No.: WO2022/034680
PCT Pub. Date: Feb. 17, 2022

(65) Prior Publication Data
US 2023/0289998 A1   Sep. 14, 2023

(51) Int. Cl.
*G06T 7/73*       (2017.01)
*G06V 20/52*      (2022.01)
*G06V 40/10*      (2022.01)

(52) U.S. Cl.
CPC .............. *G06T 7/73* (2017.01); *G06V 20/52* (2022.01); *G06T 2207/20044* (2013.01); *G06V 40/103* (2022.01); *G06V 2201/07* (2022.01)

(58) Field of Classification Search
CPC . G06T 7/73; G06T 2207/20044; G06V 20/52; G06V 2201/07; G06V 10/82; G06V 40/103
See application file for complete search history.

(56) References Cited

U.S. PATENT DOCUMENTS

2020/0242345 A1*  7/2020  Huang .................... G06V 10/44
2021/0034868 A1*  2/2021  Kang .................... H04W 4/023
2021/0166012 A1   6/2021  Piao

FOREIGN PATENT DOCUMENTS

| JP | 2012133665 A | * | 7/2012 |
| JP | 2016-119627 A | | 6/2016 |
| JP | 2018-206321 A | | 12/2018 |
| JP | 2020-123328 A | | 8/2020 |
| WO | 2020/016963 A1 | | 1/2020 |

OTHER PUBLICATIONS

International Search Report for PCT Application No. PCT/JP2020/030837, mailed on Oct. 27, 2020.

* cited by examiner

*Primary Examiner* — Jon Chang

(57) ABSTRACT

In an object recognition device, an estimation means estimates a possession of the person based on a pose of a person in an image. An object detection means detects an object from surroundings of the person in the image. A weighting means sets weights with respect to an estimation result of the possession and a detection result of the object based on the image. A combination unit combines the estimation result of the possession and the detection result of the object by using the weights being set, and recognizes the possession of the person.

9 Claims, 13 Drawing Sheets

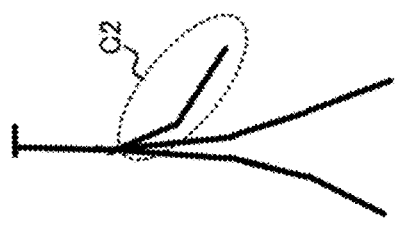
FIG. 2C
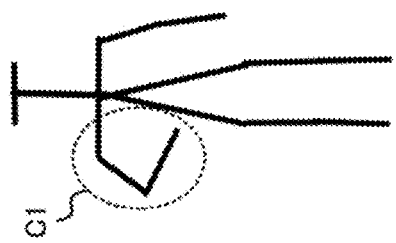
FIG. 2F
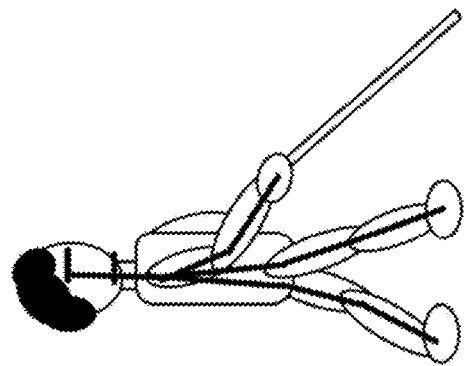
FIG. 2B
FIG. 2E
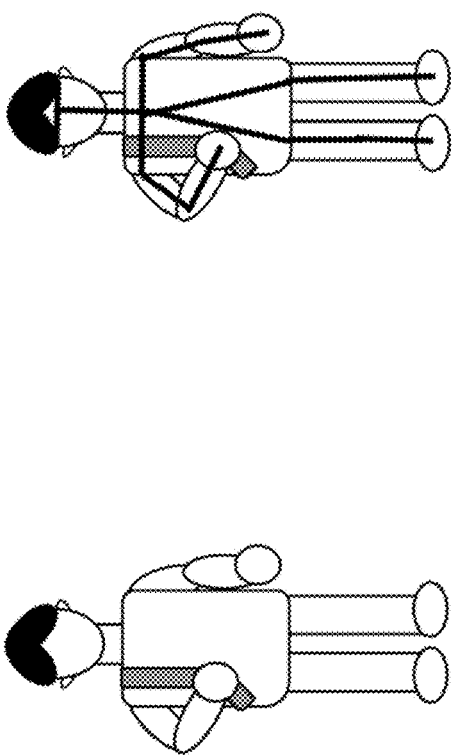
FIG. 2A
FIG. 2D

OBJECT RECOGNITION DEVICE, OBJECT RECOGNITION METHOD, AND RECORDING MEDIUM

This application is a National Stage Entry of PCT/JP2020/030837 filed on Aug. 14, 2020, the contents of all of which are incorporated herein by reference, in their entirety.

TECHNICAL FIELD

The present disclosure relates to a technology for recognizing an object possessed by a person appeared in an image.

BACKGROUND ART

A possession of a person such as a bag, a backpack, and a cane may be detected from an image captured by a surveillance camera or the like. In this case, basically, an object is detected directly from the captured image by using an object detection technique. Note that, Patent Document 1 describes a technique for detecting the person and the object around the person from the captured image and estimating a behavior of the person.

PRECEDING TECHNICAL REFERENCES

Patent Document

Patent Document 1: Japanese Laid-open Patent Publication No. 2018-206321

SUMMARY

Problem to be Solved by the Invention

However, it is not always a case that a possession of a person is clearly visible in a captured image. For instance, depending on an angle of a view of a camera, the possession may be hidden behind the person. Also, in a case where the possession is thin such as a cane, the captured image may not have sufficient resolution. In such the case, a detection accuracy of the possession is reduced with a normal object detection technique.

It is one object of the present disclosure to provide an object recognition device capable of improving the recognition accuracy of the object even in a case the possession is not clearly visible in the image.

Means for Solving the Problem

According to an example aspect of the present disclosure, there is provided an object recognition device including:
an estimation means configured to estimate a possession of a person based on a pose of the person in an image;
an object detection means configured to detect an object from surroundings of the person in the image;
a weighting means configured to set weights with respect to an estimation result of the possession and a detection result of the object based on the image; and
a combination means configured to combine the estimation result of the possession and the detection result of the object by using the weights being set, and recognize the possession of the person.

According to another example aspect of the present disclosure, there is provided an object recognition method, including:
estimating a possession of a person based on a pose of the person in an image;
detecting an object from surroundings of the person in the image;
setting weights with respect to an estimation result of the possession and a detection result of the object based on the image; and
combining the estimation result of the possession and the detection result of the object by using the weights being set, and recognizing the possession of the person.

According to a further example aspect of the present disclosure, there is provided a recording medium storing a program, the program causing a computer to perform a process including:
estimating a possession of a person based on a pose of the person in an image;
detecting an object from surroundings of the person in the image;
setting weights with respect to an estimation result of the possession and a detection result of the object based on the image; and
combining the estimation result of the possession and the detection result of the object by using the weights being set, and recognizing the possession of the person.

Effect of the Invention

According to the present disclosure, it becomes possible to improve recognition accuracy of a possession even in a case where the possession is not clearly visible in an image.

BRIEF DESCRIPTION OF THE DRAWINGS

FIG. 2A to FIG. 2F are diagrams for explaining a method for detecting a pose of the person.

EXAMPLE EMBODIMENTS

<Basic Principle>

An object recognition device according to example embodiments of the present disclosure recognizes a possession of a person in an image. First, a basic principle of the object recognition device according to the example embodiments will be described.

[Basic Concept]

In a case of detecting a possession of a person from an image from a surveillance camera or the like, basically, the possession captured in the image is directly detected by an object detection method. However, in a case where the possession is hidden by the person due to an installation angle of the camera (so-called occlusion occurs) or in a case where resolution of the possession is low, detection accuracy of the possession is reduced.

Figure 1A:
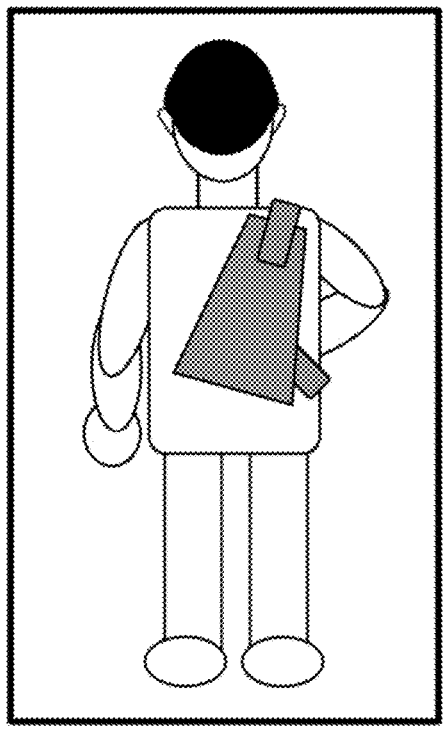
FIG. 1A to FIG. 1D illustrate examples of an image which captures a state in which a person holds a possession.
Figure 1B:
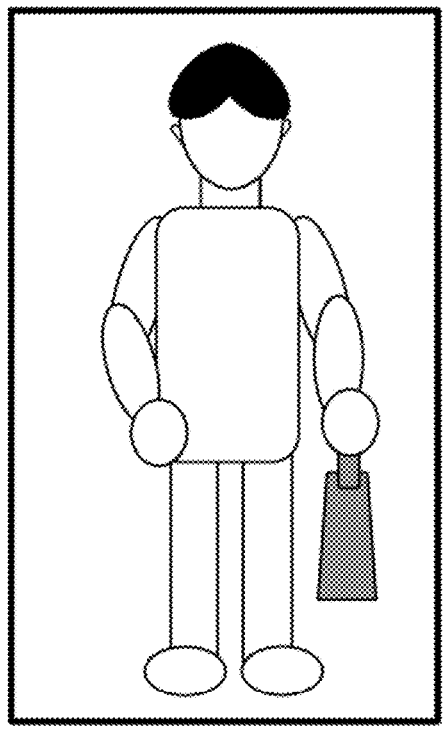

FIG. 1A to FIG. 1D illustrate examples of images acquired by capturing a state in which a person holds a possession. FIG. 1A illustrates an image taken from a rear of the person carrying a backpack or a shoulder bag (collectively referred to as a "bag"), and FIG. 1B illustrates an image taken from a front of the person carrying a handbag. In such the case where the possession is clearly captured in the image, it is possible to detect the possession using a general object detection method.

Figure 1C:
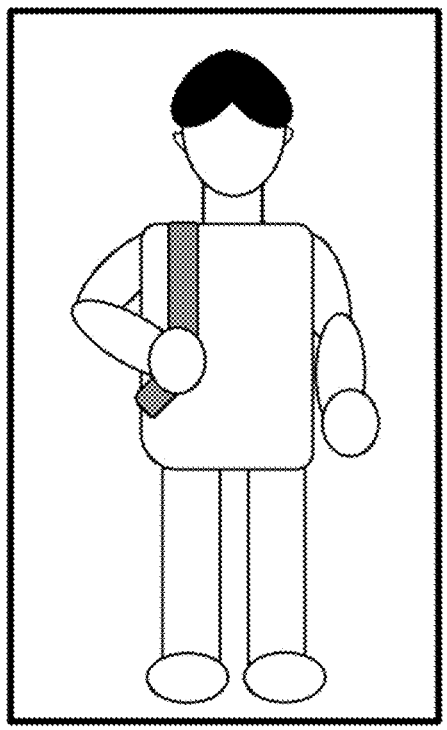
Figure 1D:
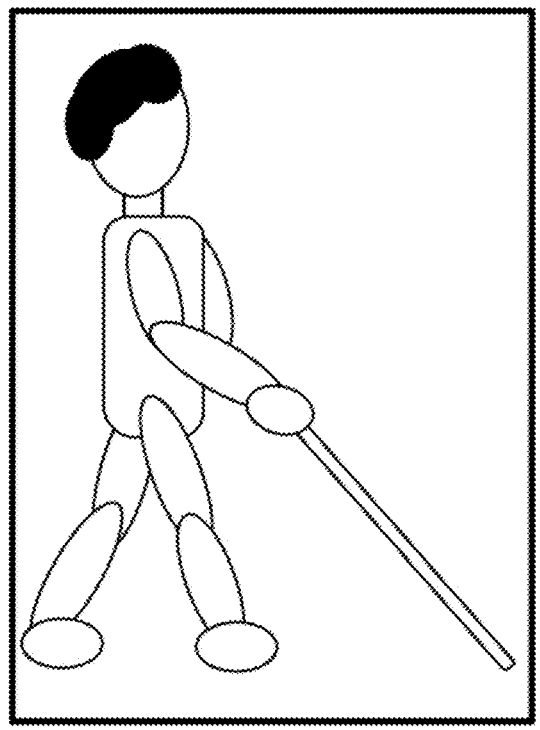

On the other hand, FIG. 1C illustrates an image taken from a front in a state in which the person is carrying the bag, and FIG. 1D illustrates an image of the person holding a white cane taken from a side. In the image in FIG. 1C, the bag cannot be detected directly from the image because the bag is hidden by a body of the person. In addition, although the white cane is illustrated in the image in FIG. 1D, since the white cane is thin, the resolution in the image is not sufficient, and detection by the general object detection method is difficult.

However, a pose of the person sometimes becomes a characteristic pose due to holding of the possession. As illustrated in FIG. 1C, in a case where the person is carrying the bag on a back of the person, the person tends to grip a strap to keep the bag from falling, and an arm gripping the strap is often bent at an elbow. Accordingly, in a case where the person is in a pose in which the elbow is bent and overhangs laterally, it is considered that the person may be carrying the bag. Similarly, as illustrated in FIG. 1D, when the person has the white cane, the elbow of the person having the white cane bends, and a hand with the white cane tends to be in an extended pose in a front of a body. Therefore, it is considered possible that a person may have the white cane when the person is in such the pose. Accordingly, in a case where the person tends to be in a particular pose when holding a particular possession, it can be estimated that the person who is in the particular pose is likely to have the particular possession even if the possession itself is not in the image. Accordingly, the object recognition device of the example embodiments estimates a possession of the person based on the pose of the person. According to this estimation method, it is possible to detect the possession indirectly from the pose of the person even in a case where the possession itself does not appear clearly in the image. Hereinafter, the pose of the person holding the particular possession is referred to as a "possession holding pose". FIG. 1C and FIG. 1D illustrate examples of the possession holding poses.

FIG. 2A to FIG. 2F are diagrams for explaining a method for detecting the pose of the person. The pose of the person can be specified by detecting positions of a skeleton and joints of the person. FIG. 2A illustrates a view of the person carrying a bag from a front. From this image, by extracting the positions of the skeleton and joints of the person as illustrated in FIG. 2B, it is possible to detect a pose in which an elbow overhangs laterally as depicted in an ellipse C1 in FIG. 2C. FIG. 2D illustrates a side view of the person with the white cane. From this image, by extracting positions of a human skeleton and joints of the person as illustrated in FIG. 2E, it is possible to detect a pose in which a hand is extended forward as depicted in the ellipse C2 in FIG. 2F.

Figure 3:
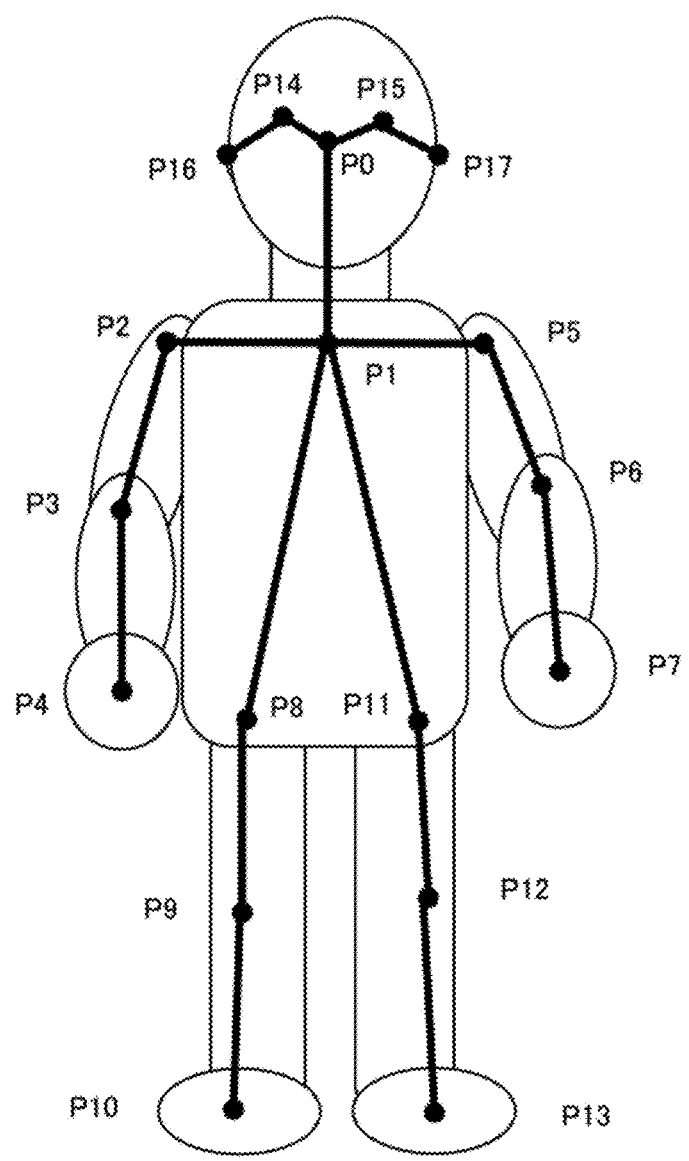
FIG. 3 illustrates an example of pose information.

Next, the object recognition device generates information (hereinafter, referred to as "pose information") indicating respective positional relationships among a plurality of parts of a body defining the pose of the person. FIG. 3 illustrates an example of the pose information. In this example, predetermined parts which constitute a skeleton and joints of the person are decided in advance, and positions of these parts are detected in an image of the person. In detail, in an instance in FIG. 3, a part P0 indicates a nose and a part P1 indicates a neck base. A part P2 indicates a right shoulder, a part P3 indicates a right elbow, a part P4 indicates a right wrist, a part P8 indicates the base of the right foot, a part P9 indicates a right knee, and a part P10 indicates a right ankle. Similarly, a part P5 indicates a left shoulder, a part P6 indicates a left elbow, a part P7 indicates a left wrist, a part P11 indicates a base of a left foot, a part P12 indicates a left knee, and a part P13 indicates a right ankle. In addition, a part P14 indicates a right eye, a part P15 indicates a left eye, a part 16 indicates a right ear, and a part P17 indicates a left ear. As described above, the object recognition device extracts the positions of the predetermined parts of the body from the image of the person, and generates the pose information indicating respective positional relationships among these parts.

In detail, in one approach, the pose information can be represented as a set of coordinate values of respective parts P0 to P17 in a coordinate system defined for the image. In the alternative, the pose information can be represented as a vector from one part being a reference to another part. For instance, the part P1 corresponding to the neck base can be used as a reference point, and the pose information can be described as a set of respective vectors from the part P1 to other parts P0 and P2 to P17. Note that as the pose information, in addition to the coordinates of each of the parts or the vectors to respective parts, reliability for each of the parts, a flag indicating whether each part is visible in the image, and the like may be included.

The object recognition device prepares learning data in which the possession of the person at that time is assigned as a correct answer label with respect to the pose of the person which is expressed by the above described pose information. The learning data are used for learning of a model (hereinafter referred to as a "possession estimation model") which estimates the possession from the pose of the person. That is, the learning data are learning data for the holding object estimation model, which are different from the learning data described later. In detail, in the learning data, a correct answer label "bag" is assigned to the pose information indicating the pose depicted in FIG. 2C, and a correct answer label "cane" is assigned to the pose information indicating the pose depicted in FIG. 2F. For instance, in a case where the positions P0 to P17 are used as position data, the learning data can be expressed as follows:

$P0:(x0,y0), PT:(x1,y1), \ldots ,P17:(x17,y17)$, bag.

By using the learning data prepared in this manner, the model using a neural network is trained, and the possession estimation model which estimates the possession from the pose information of the person is generated. Next, the object recognition device estimates the possession from the pose of the person in the image using the generated possession estimation model.

[Configuration at Learning]

Figure 4:
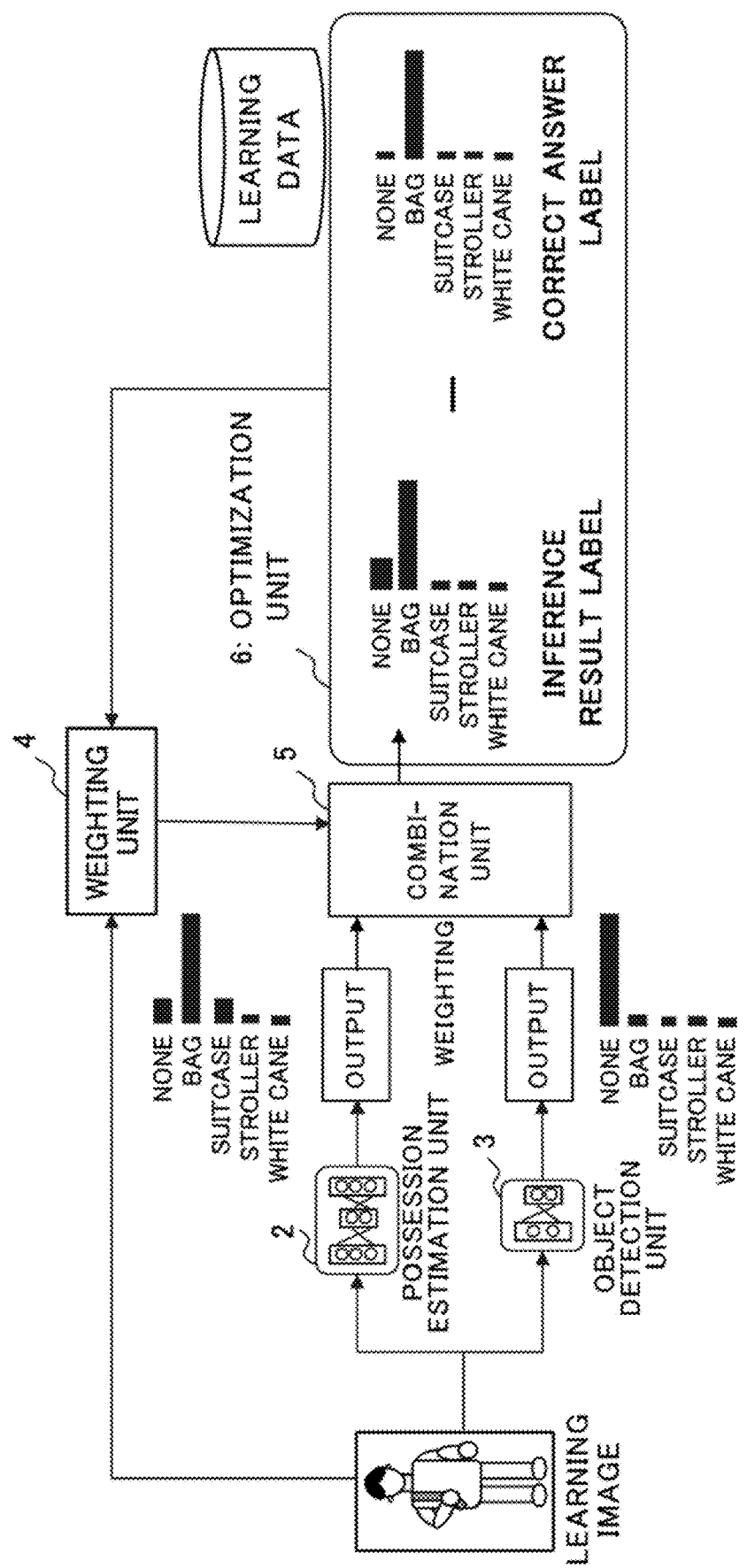
FIG. 4 is a diagram for explaining an operation at a time of learning of an object recognition device.

FIG. 4 is a diagram illustrating an operation of the object recognition device at a time of learning. The object recognition device includes a possession estimation unit 2, an object detection unit 3, a weighting unit 4, a combination unit 5, and an optimization unit 6. At the time of learning, the learning data are prepared in which an image for learning is associated with a correct answer label indicating a possession of a person in the image. Note that, the learning data are different from learning data for the possession estimation model described above. A learning image is input to the possession estimation unit 2, the object detection unit 3, and the weighting unit 4. Here, it is assumed that the learning image is regarded as an image in which the person carrying the backpack is captured from the front as depicted in FIG. 2A.

The possession estimation unit 2 is formed by the possession estimation model previously trained using the learning data for the possession estimation model described above. The possession estimation unit 2 extracts the pose information from the learning image being input, and outputs a result (hereinafter, referred to as an "estimation result") from estimating the possession based on the pose information. In detail, the estimation result indicates each score indicating a likelihood that the possession of the person in the image is one of possessions defined in advance. In the example in FIG. 4, the score of "bag" is the highest in the estimation result output from the possession estimation unit 2. The estimation result is output to the combination unit 5.

The object detection unit 3 performs an object detection from the learning image using a general object detection model, and outputs a detection result of the possession to the combination unit 5. In the example in FIG. 4, since only the strap portion of the bag is captured in the learning image, the score for "none" of the possession is highest in the detection result.

The weighting unit 4 sets weights for the estimation result output from the possession estimation unit 2 and the detection result output from the object detection unit 3 based on the learning image, and outputs the weights to the combination unit 5. The combination unit 5 combines the estimation result by the possession estimation unit 2 and the detection result by the object detection unit 3, generates an inference result label by using the weights which are set by the weighting unit 4, and outputs the generated inference result to the optimization unit 6.

The optimization unit 6 calculates an error (loss) between the inference result label output from the combination unit 5 and the correct answer label which is prepared as the learning data, and optimizes the weighting unit 4 in order to minimize the error. Accordingly, the weighting unit 4 is trained to increase the weight with respect to the estimation result by the possession estimation unit 2 as the pose of the person included in the input image is close to the possession holding pose, and to increase the weight with respect to the detection result output from the object detection unit 3 when the possession itself appears in the learning image.

[Configuration at Inference]

Figure 5:
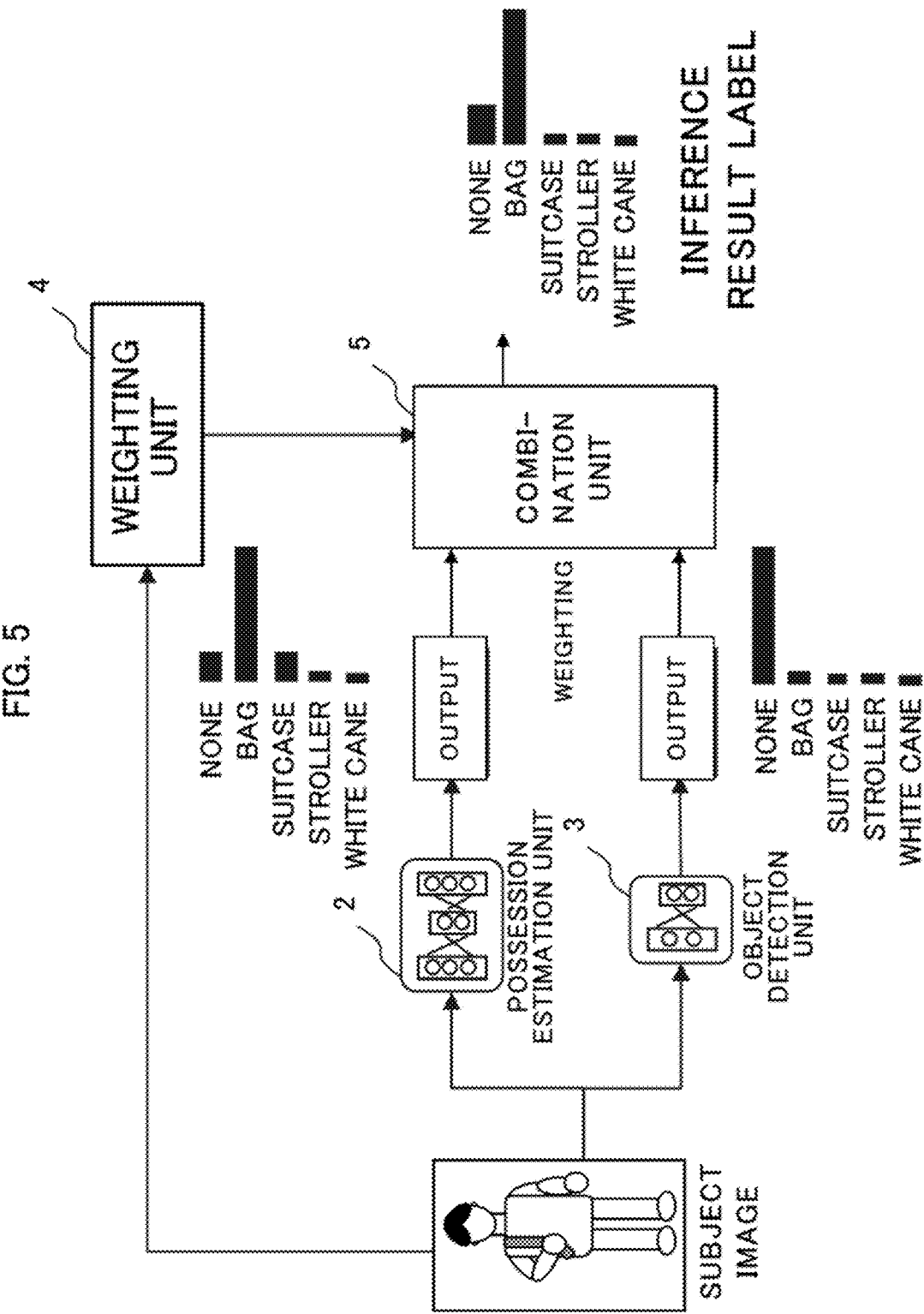
FIG. 5 is a diagram for explaining an operation at a time of inference of the object recognition device.

FIG. 5 is a diagram illustrating an operation of the object recognition device at a time of inference. At the time of inference, the weighting unit 4 is in a state of being optimized by learning. In response to an input of an image to be recognized (hereinafter, referred to as a "subject image"), the possession estimation unit 2 extracts a pose of a person in the subject image, estimates a possession based on the pose, and outputs an estimation result to the combination unit 5. The object detection unit 3 detects the possession in the subject image, and outputs the detection result to the combination unit 5. The weighting unit 4 determines the weights for the estimation result and the detection result based on the subject image, and outputs the weights to the combination unit 5. The combination unit 5 combines the estimation result output from the possession estimation unit 2 and the detection result output from the object detection unit 3, by using the weights which are set by the weighting unit 4, and outputs the combined result as a possession inference result label.

As described above, since the object recognition device includes the possession estimation unit 2 that estimates the possession based on the pose of the person in the image, the possession can be estimated even in a case where the possession is not clearly visible in the subject image.

First Example Embodiment

Next, a first example embodiment of the present disclosure will be described.

[Hardware Configuration]

Figure 6:
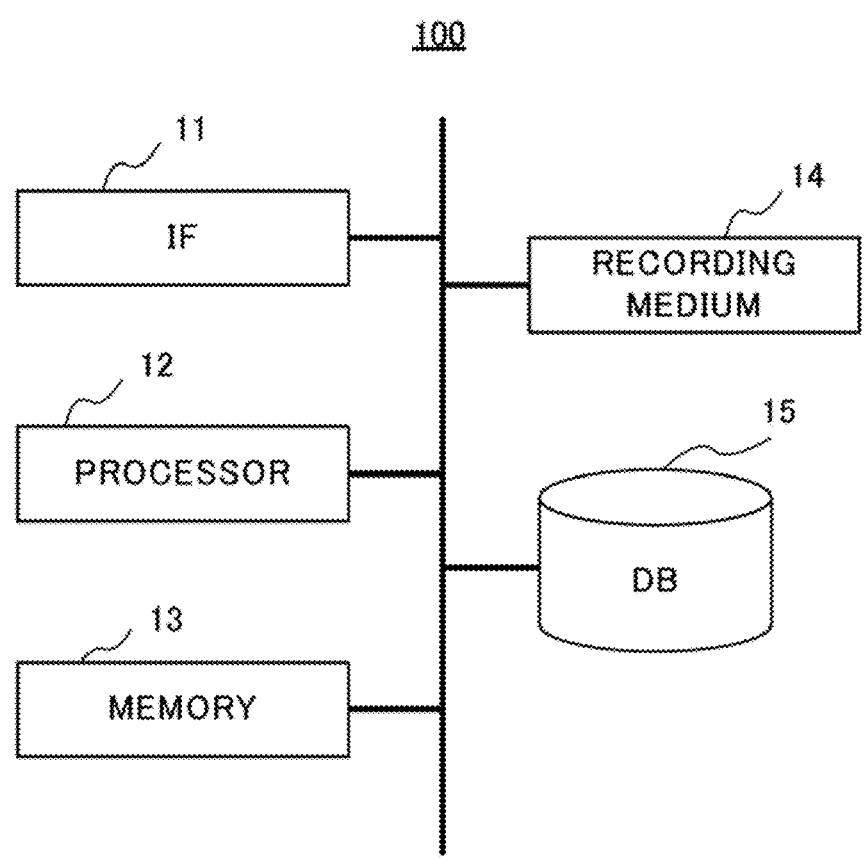
FIG. 6 is a block diagram illustrating a hardware configuration of an object recognition device of a first example embodiment.

FIG. 6 is a block diagram illustrating a hardware configuration of the object recognition device according to the first example embodiment. As illustrated in FIG. 6, an object recognition device 100 includes an interface (IF) 11, a processor 12, memory 13, a recording medium 14, and a database (DB) 15.

The interface 11 communicates with an external device. In detail, the interface 11 is used to input an image or a learning image to be recognized from the external device or to output the recognition result to the external device.

The processor 12 corresponds to one or more processors each being a computer such as a CPU (Central Processing Unit), or the CPU along with a GPU (Graphics Processing Unit), that controls the entire object recognition device 100 by executing programs prepared in advance. The memory 13 is formed by a ROM (Read Only Memory), a RAM (Random Access Memory), and the like. The memory 13 stores various programs executed by the processor 12. The memory 13 is also used as a working memory during various processes performed by the processor 12.

The recording medium 14 is a non-volatile and non-transitory recording medium such as a disk-like recording medium or a semiconductor memory and is detachably formed with respect to the object recognition device 100. The recording medium 14 records the various programs executed by the processor 12. When the object recognition device 100 executes a learning process and an inference process described later, the programs recorded in the recording medium 14 are loaded into the memory 13 and executed by the processor 12.

The database 15 stores the learning data used in the learning process of the object recognition device 100. The learning data include images for learning and correct answer labels. Moreover, the database 15 stores information of a structure and parameters of the neural network forming the possession estimation unit, the object detection unit, and the weighting unit. Note that in addition to the above, the object recognition device 100 may include an input device such as a keyboard, a mouse, a display device, or the like.

[Configuration at Learning]

Figure 7:
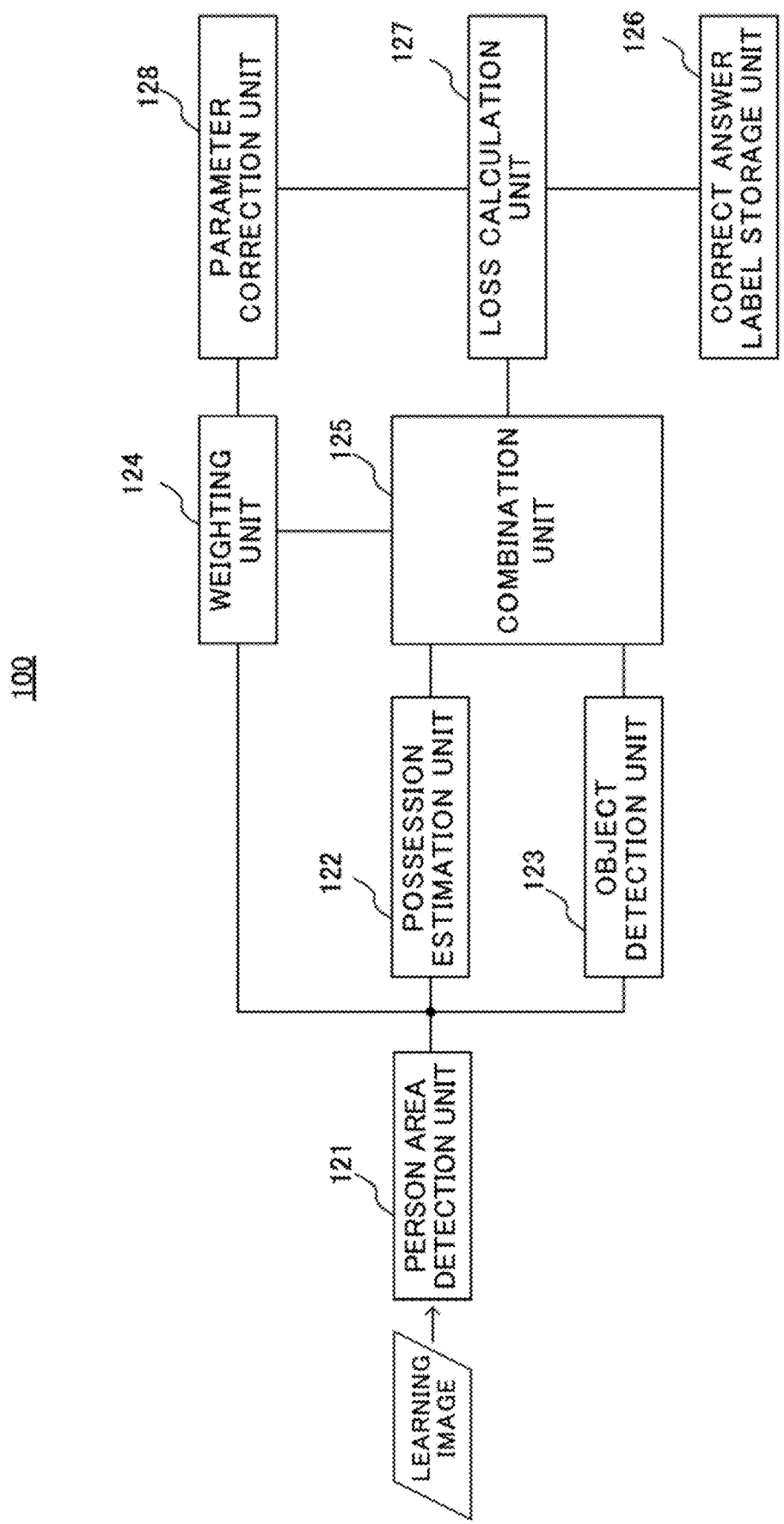
FIG. 7 is a block diagram illustrating a functional configuration of the object recognition device at a time of learning in the first example embodiment.

Next, a functional configuration of the object recognition device 100 at the time of learning will be described. FIG. 7 is a block diagram illustrating a functional configuration of the object recognition device 100 at the time of learning. As illustrated in FIG. 7, the object recognition device 100 includes a person area detection unit 121, a possession estimation unit 122, an object detection unit 123, a weighting unit 124, a combination unit 125, a correct answer label storage unit 126, a loss calculation unit 127, and a parameter correction unit 128. The person area detection unit 121, the possession estimation unit 122, the object detection unit 123, the weighting unit 124, the combination unit 125, the loss calculation unit 127, and the parameter correction unit 128 are realized by the processor 12, and the correct answer label storage unit 126 is realized by the database 15.

Each of the person area detection unit 121, the possession estimation unit 122, the object detection unit 123, and the weighting unit 124 is formed by the neural network. At the time of learning, the object recognition device 100 optimizes parameters (hereinafter, referred to as "weight calculation parameters") for calculating the weights which the weighting unit 124 has therein. The person area detection unit 121, the possession estimation unit 122, and the object detection unit 123 use models that have already been trained, and are not subjects to be trained here.

A learning image is input to the person area detection unit 121. As described above, for the learning image, the correct answer label indicating the possession of the person in the image is prepared in advance. The person area detection unit 121 detects a rectangular area (hereinafter, referred to as a "person area") including the person from the learning image being input, and outputs an image of the person area to the possession estimation unit 122, the object detection unit 123, and the weighting unit 124.

The possession estimation unit 122 generates the pose information of the person included in the image of the person area. That is, the possession estimation unit 122 generates the pose information indicating respective positional relationships among the predetermined parts depicted in FIG. 3 for the person included in the person area. Note that, the generation of the pose information, for instance, it is possible to use a pose estimation method such as an OpenPose, PoseNet, or the like. Next, the possession estimation unit 122 estimates the possession of the person based on the pose information using the trained possession estimation model. As illustrated in FIG. 4, the possession estimation unit 122 generates scores indicating likelihoods that the possession corresponding to the pose of the person is respective objects defined in advance, as the estimation result, and outputs the generated scores for the objects to the combination unit 125.

The object detection unit 123 is formed using the neural network for the object recognition, for instance, a SSD (Single Shot Multibox Detector), a RetinaNet, or a Faster-RCNN (Regional Convolutional Neural Network), and detects the possession included in the image of the person area. In detail, as illustrated in FIG. 4, the object detection unit 123 generates, as the detection result, the scores indicating the likelihoods that the possession included in the image of the person area is respective objects defined in advance, and outputs the scores to the combination unit 125.

The weighting unit 124 is formed by a deep neural network or the like which is applicable to a regression problem such as a ResNet (Residual Network (residual network). The weighting unit 124 sets weights at a time of combining the estimation result of the possession which is output from the possession estimation unit 122 with the detection result of the object which is output from the object detection unit 123, and outputs respective weights to the combination unit 125.

The combination unit 125 combines the estimation result output from the possession estimation unit 122 with the detection result output from the object detection unit 123 by the weights set by the weighting unit 124. In detail, the combination unit 125 applies the weights determined by the weighting unit 124 to the scores of objects output from the holding possession estimation unit 122 and the scores of objects output from the object detection unit 123, and calculates a sum of the weighted scores, and outputs a result as the inference result label to the loss calculation unit 127.

The correct answer label storage unit 126 stores respective correct answer labels for the learning images. In detail, the correct answer label storage unit 126 stores information of each possession of the person in the learning image as the correct answer label. The loss calculation unit 127 calculates a loss between the inference result labels output from the combination unit 125 and the correct answer label stored in the correct answer label storage unit 126, and outputs the loss to the parameter correction unit 128.

The parameter correction unit 128 corrects the parameters of the neural network inherent in the weighting unit 124 so as to reduce the loss calculated by the loss calculation unit 127. The parameter correction unit 128 can determine a correction amount of the parameters by a normal error backpropagation method (backpropagation). Accordingly, by learning the parameters of the weighting unit 124 in this manner, it is possible to form an object recognition device capable of accurately recognizing each possession from an image being input.

[Learning Process]

Figure 8:
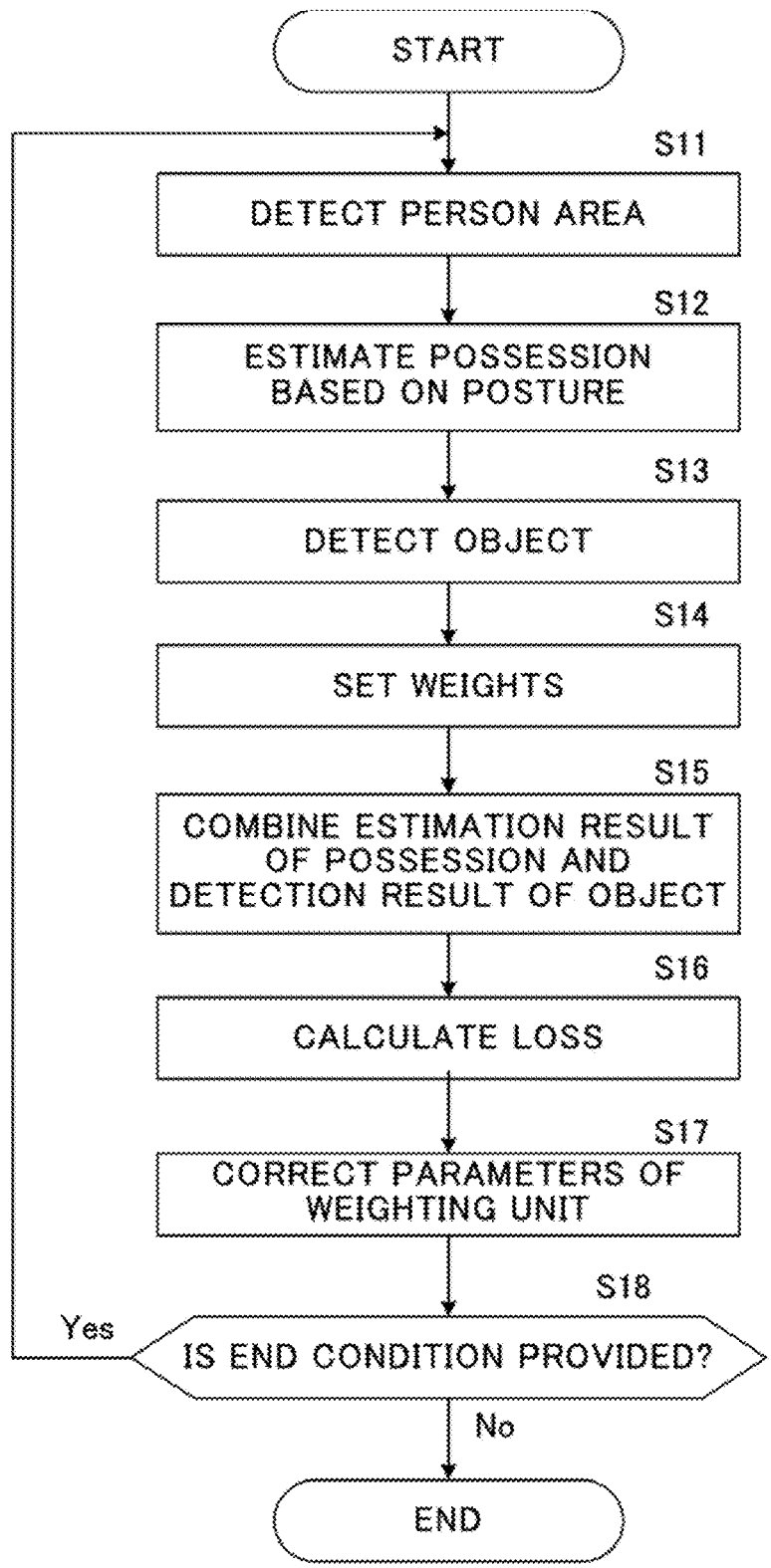
FIG. 8 is a flowchart of a learning process by the object recognition device of the first example embodiment.

Next, the learning process performed by the object recognition device 100 will be described. FIG. 8 is a flowchart of the learning process that is performed by the object recognition device 100. This learning process is realized by executing a program prepared in advance by the processor 12 depicted in FIG. 6.

First, the learning image is input, and the person area detection unit 121 detects the person area from the image being input (step S11). Next, the possession estimation unit 122 generates the pose information indicating the pose of the person based on the image of the person area, and estimates the pose of the person based on the pose information (step S12). The object detection unit 123 detects the possession from an image of the person area (step S13). The weighting unit 124 sets the weights for the estimation result of the person area by the possession estimation unit 122 and the detection result of the object detection unit 123 based on the image of the person area (step S14).

Next, the combination unit 125 combines the estimation result output from the possession estimation unit 122 with the detection result output from the object detection unit 123 by using the weights which are set by the weighting unit 124, and outputs the acquired inference result label to the loss calculation unit 127 (step S15). The loss calculation unit 127 calculates the loss between the acquired inference result label and the correct answer label acquired from the correct answer label storage unit 126 (step S16). Next, the parameter correction unit 128 corrects the weight calculation parameter inherent in the weighting unit 124 in order to reduce a value of the loss (step S17).

Next, the object recognition device 100 determines whether or not a predetermined end condition is provided (step S18). The "end condition" is a condition related to the number of iterations, a degree of convergence of a loss, or the like, and any one of methods adopted as a learning procedure of many deep learnings can be used. The object recognition device 100 iterates the above described steps S11 to S17 until the end condition is provided, and terminates the learning process when the end condition is provided.

[Configuration at Inference]

Figure 9:
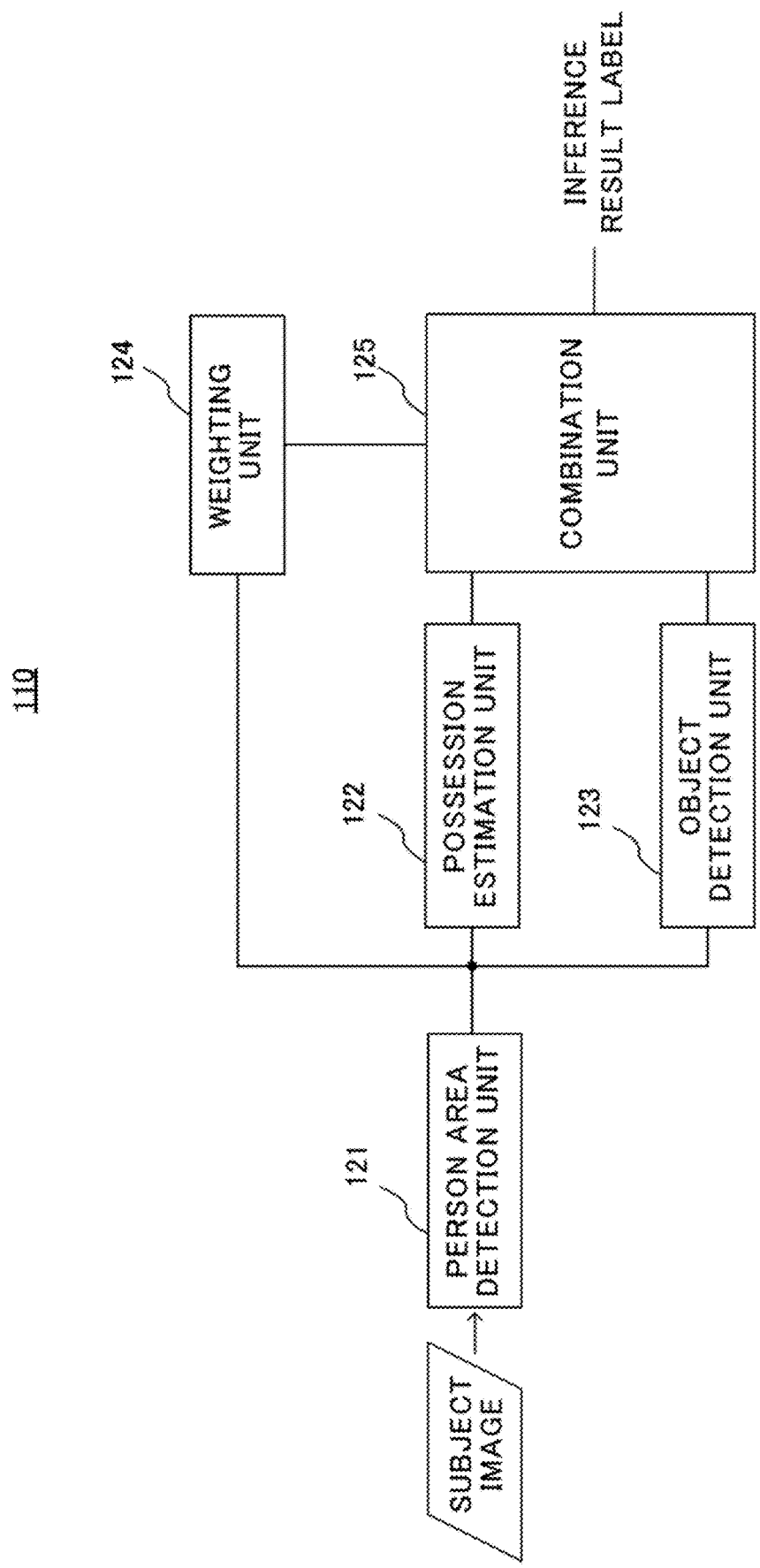
FIG. 9 is a block diagram illustrating a functional configuration of the object recognition device at a time of inference in the first example embodiment.

Next, a configuration of the object recognition device at a time of inference will be described. FIG. 9 is a block diagram illustrating a functional configuration of an object recognition device 110 at the time of inference. The object recognition device 110 at the time of inference is also basically realized by the hardware configuration illustrated in FIG. 6.

As illustrated in FIG. 9, the object recognition device 110 at the time of inference includes the person area detection unit 121, the possession estimation unit 122, the object detection unit 123, the weighting unit 124, and the combination unit 125, similar to a case of learning. The weight calculation parameters corrected in the learning process in FIG. 8 are set in the weighting unit 124.

[Inference Process]

Figure 10:
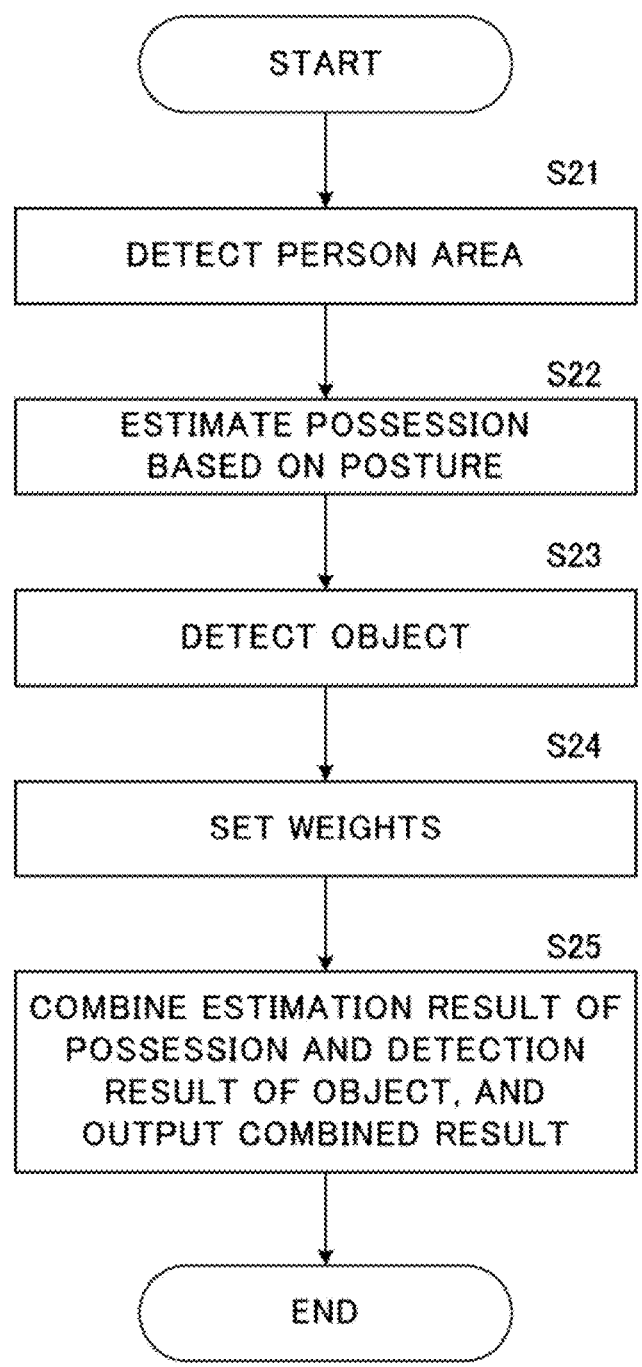
FIG. 10 is a flowchart of an inference process by the object recognition device of the first example embodiment.

Next, an inference process performed by the object recognition device 110 will be described. FIG. 10 is a flowchart of the inference process that is performed by the object recognition device 110. This inference process is realized by executing a program prepared in advance by the processor 12 depicted in FIG. 6.

First, a subject image for the object recognition is input, and the person area detection unit 121 detects the person area from the input image (step S21). Next, the possession estimation unit 122 generates the pose information indicating the pose of the person from the image of the person area, and estimates the pose of the person based on the pose information (step S22). Next, the object detection unit 123 detects an object from the image of the person area (step S23). The weighting unit 124 sets weights for the estimation result of the person area by the possession estimation unit 122 and the detection result of the object detection unit 123 based on an image of the person area (step S24).

Next, the combination unit 125 combines the estimation result of the possession estimation unit 122 with the detection result of the object detection unit 123 by using the weights set by the weighting unit 124, and outputs the acquired inference result label (step S25). In this manner, the possession of the person included in the subject image is recognized.

Second Example Embodiment

Next, a second example embodiment of the present disclosure will be described.

[Configuration at Learning]

Figure 11:
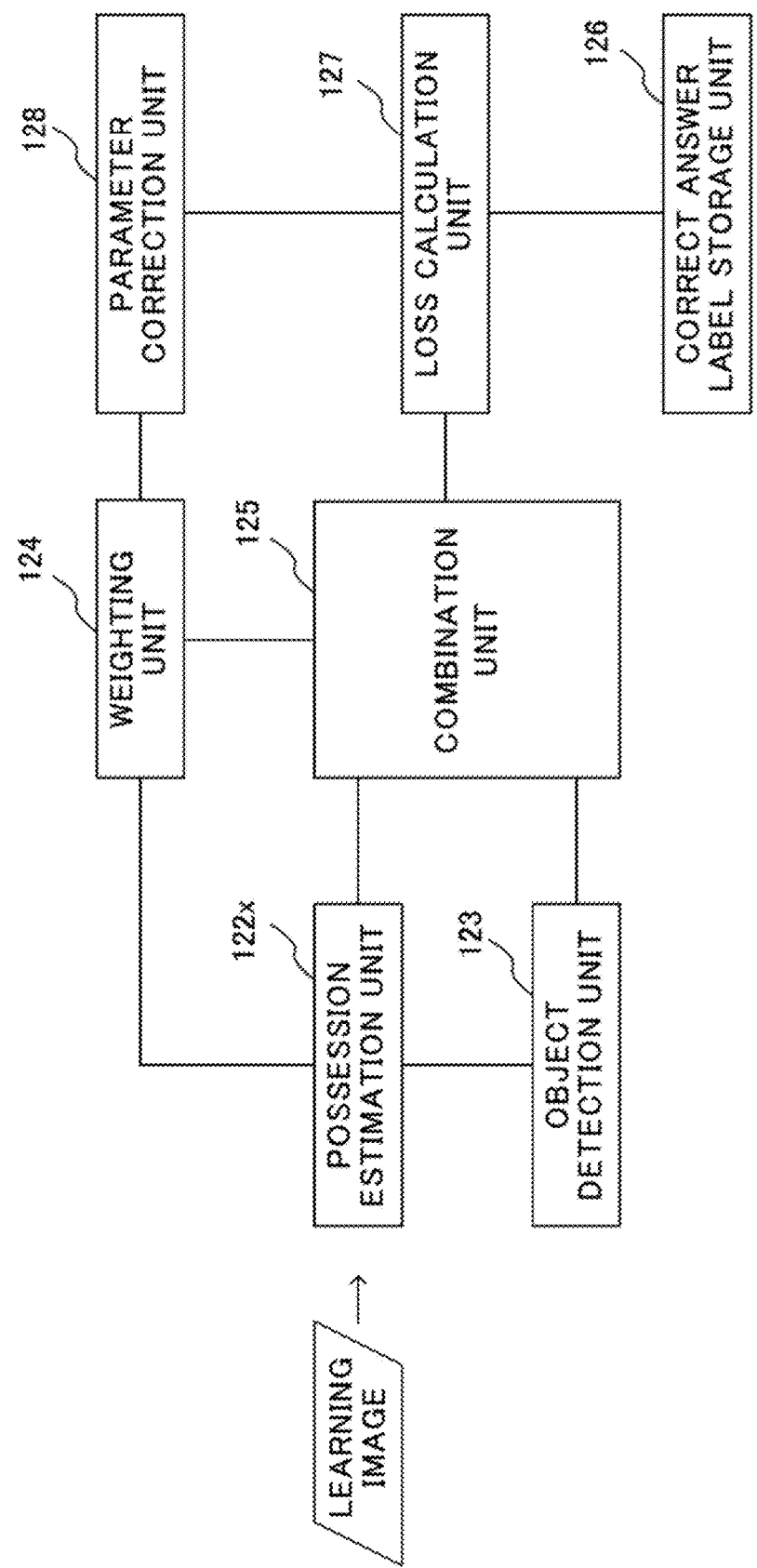
FIG. 11 is a block diagram illustrating a functional configuration of an object recognition device at a time of learning in a second example embodiment.

FIG. 11 is a block diagram illustrating a functional configuration of an object recognition device 100x at the time of learning. Note that, the object recognition device 100x is realized by the hardware configuration depicted in FIG. 6.

The object recognition device 100x includes a possession estimation unit 122x, the object detection unit 123, the weighting unit 124, the combination unit 125, the correct answer label storage unit 126, the loss calculation unit 127, and the parameter correction unit 128. In the second example embodiment, the possession estimation unit 122x includes a function of the person area detection unit 121 in addition to the function of the possession estimation unit 122 in the first example embodiment. Other than this point, the object recognition device 100x is the same as the object recognition device 100 of the first example embodiment. That is, the object detection unit 123, the weighting unit 124, the combination unit 125, the correct answer label storage unit 126, the loss calculation unit 127, and the parameter correction unit 128 are the same as those in the first example embodiment.

The possession estimation unit 122x includes a function for generating the pose information from the input image and a function for detecting a person area. For instance, the possession estimation unit 122x extracts the pose information indicating a skeleton or positions of joints of a person as depicted in FIG. 3 from the input image, and detects a rectangular area which includes the person and is formed by the extracted pose information as the person area. The possession estimation unit 122x estimates the possession of the person based on the pose information. The estimation result is output to the combination unit 125. The possession estimation unit 122x outputs an image of the detected person area to the object detection unit 123 and the weighting unit 124.

The object detection unit 123 detects a possession from the image of the person area input from the possession estimation unit 122x, and outputs the detected result to the combination unit 125. The weighting unit 124 sets the weights for the estimation result of the possession estimation unit 122x and the detection result of the object detection unit 123 based on the image of the person area input from the possession estimation unit 122x, and outputs the weights to the combination unit 125. The combination unit 125, the correct answer label storage unit 126, the loss calculation unit 127, and the parameter correction unit 128 operate in the same manner as the first example embodiment.

[Learning Process]

The learning process by the object recognition device 100x is basically the same as the learning process of the first example embodiment depicted in FIG. 8. However, in step S11, the possession estimation unit 122x detects the person area. In step S13, the object detection unit 123 detects a possession from an image of the person area detected by the possession estimation unit 122x. In step S14, the weighting unit 124 sets weights based on the image of the person area detected by the possession estimation unit 122x.

[Configuration at Inference]

Figure 12:
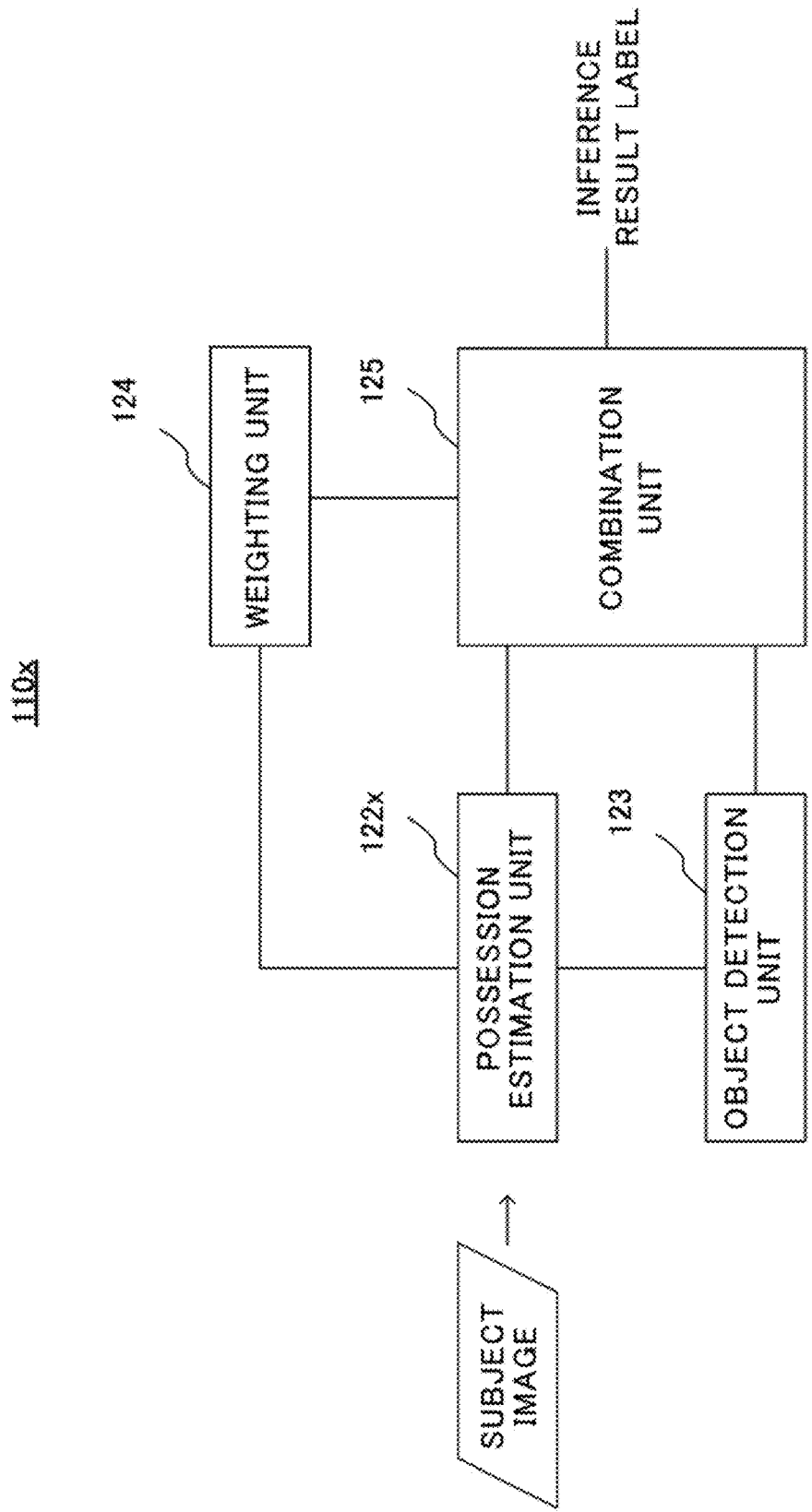
FIG. 12 is a block diagram illustrating a functional configuration of the object recognition device at a time of inference in the second example embodiment.

FIG. 12 is a block diagram illustrating a functional configuration of an object recognition device 110x at a time of inference. It is a block diagram illustrating a functional configuration of an object recognition device 110x at the time of inference. The object recognition device 110x at the time of inference is also basically realized by the hardware configuration depicted in FIG. 6.

As illustrated in FIG. 12, the object recognition device 110x at the time of inference includes a possession estimation unit 122x, the object detection unit 123, the weighting unit 124, and the combination unit 125. Similar to the learning time, the possession estimation unit 122x generates the pose information of the person from the input image, and detects a rectangular area including a person as the person area. After that, the possession estimation unit 122x estimates a possession of the person based on the pose information, and outputs the estimation result to the combination unit 125. The possession estimation unit 122x outputs the detected image of the person area to the object detection unit 123 and the weighting unit 124. Note that the weight calculation parameters corrected by the above described learning process are set in the weighting unit 124.

[Inference Process]

The inference process by the object recognition device 110x is basically the same as the inference process of the first example embodiment illustrated in FIG. 10. However, in step S21, the possession estimation unit 122x detects the person area. In step S23, the object detection unit 123 detects a possession from the image of the person area detected by the possession estimation unit 122x. In step S24, the weighting unit 124 sets the weights based on step image of the person area detected by the possession estimation unit 122x.

[Modification]

In the above described second example embodiment, the possession estimation unit 122x outputs the image of the person region to the weighting unit 124, and the weighting unit 124 sets the weights based on the image of the person area. As another example, the possession estimation unit 122x may output the pose information to the weighting unit 124 in addition to the image of the person area, and the weighting unit 124 may set the weight based on the image of the person area and the pose information.

Third Example Embodiment

Figure 13:
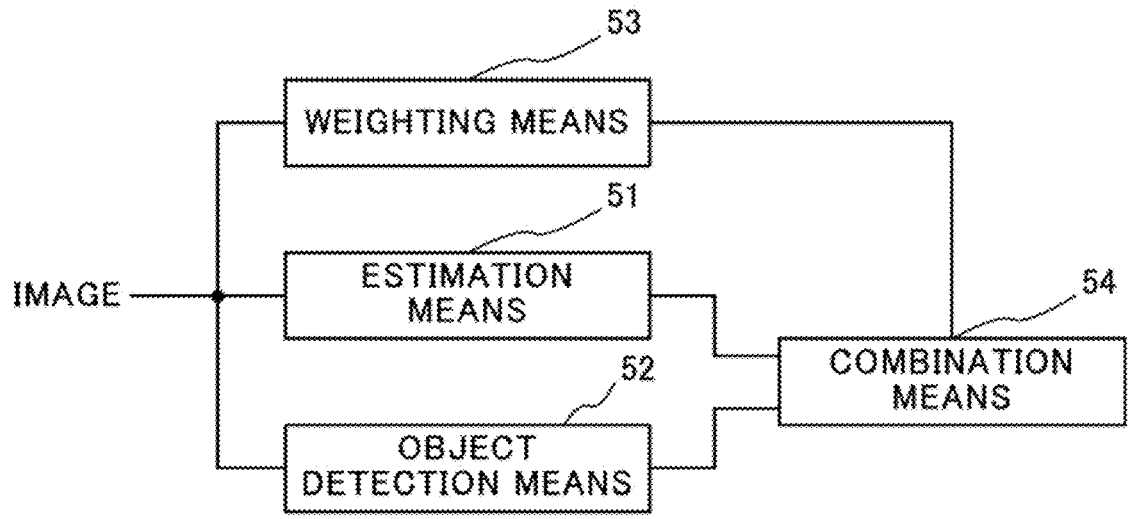
FIG. 13 is a block diagram illustrating a functional configuration of an object recognition device of a third example embodiment.

FIG. 13 is a block diagram illustrating a functional configuration of an object recognition device according to a third example embodiment. The object recognition device 50 includes an estimation means 51, an object detecting means 52, a weighting means 53, and a combination means 54.

Figure 14:
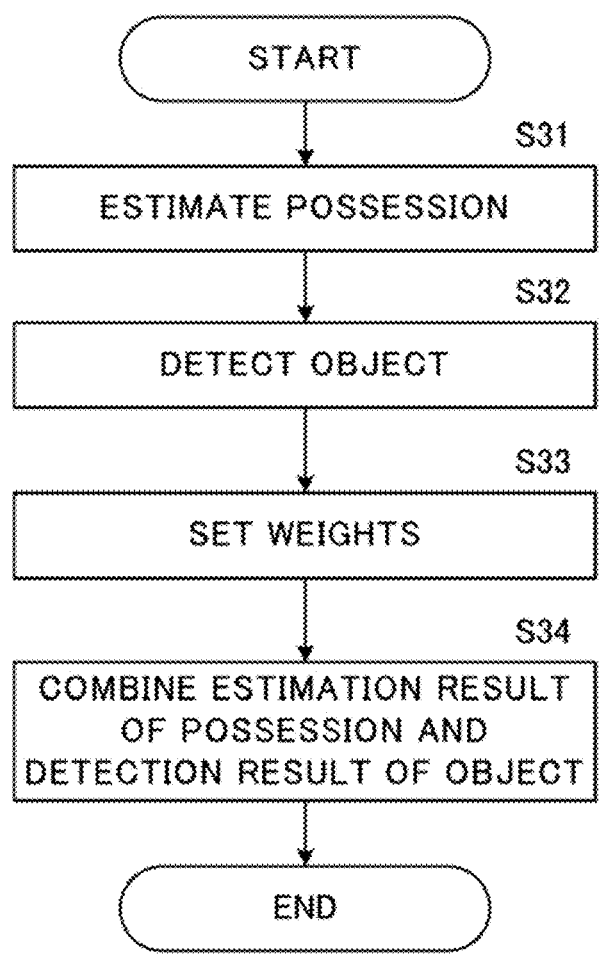
FIG. 14 is a flowchart of an inference process by the object recognition device of the third example embodiment.

FIG. 14 is a flowchart of the inference process performed by the object recognition device 50. The estimation means 51 estimates the possession of the person based on the pose of the person in each image (step S31). The object detection means 52 detects a possession from surroundings of the person in the image (step S32). The weighting means 53 sets the weights for the estimation result of the possession and the detection result of an object based on the image (step S33). The combination means 54 combines the estimation result of the possession with the detection result of the object by using the weights being set, and recognizes the possession of the person (step S34).

According to the object recognition device of the third example embodiment, since the estimation means 51 estimates the possession based on the pose of the person in the image, even in a case where the possession does not clearly visible in the image, the possession can be recognized with high reliability.

A part or all of the example embodiments described above may also be described as the following supplementary notes, but not limited thereto.

(Supplementary Note 1)

1. An object recognition device comprising:
   an estimation means configured to estimate a possession of a person based on a pose of the person in an image;
   an object detection means configured to detect an object from surroundings of the person in the image;
   a weighting means configured to set weights with respect to an estimation result of the possession and a detection result of the object based on the image; and
   a combination means configured to combine the estimation result of the possession and the detection result of the object by using the weights being set, and recognize the possession of the person.

(Supplementary Note 2)

2. The object recognition device according to supplementary note 1, wherein the estimation means generates pose information indicating respective positional relationships among a plurality of parts of a body which define the pose of the person, and estimates the possession of the person using the pose information.

(Supplementary Note 3)

3. The object recognition device according to supplementary note 2, wherein the pose information corresponds to a set of positional coordinates of the plurality of parts of the body or a set of vectors indicating the positional relationships among the plurality of parts of the body.

(Supplementary Note 4)

4. The object recognition device according to supplementary note 2 or 3, further comprising a person area detection means configured to detect a person area in the image, wherein
   the estimation means estimates the possession of the person based on the pose of the person in the person area,
   the object detection means detects the object in the person area, and
   the weighting means sets the weights based on an image of the person area.

(Supplementary Note 5)

5. The object recognition device according to supplementary note 2 or 3, wherein
   the estimation means detects the pose of the person and a person area from the image,
   the object detection means detects the object in the person area; and
   the weighting means sets the weights based on an image of the person area.

(Supplementary Note 6)

6. The object recognition device according to supplementary note 5, wherein the weighting means sets the weights based on the image of the person area and the pose information.

(Supplementary Note 7)

7. The object recognition device according to any one of supplementary notes 1 to 6, wherein
   the estimation means outputs, as the estimation result, a score indicating a likelihood that the possession is a predetermined object,
   the objection detection means outputs, as the detection result, a score indicating a likelihood that the object is a predetermined object; and
   the combination means adds the score output from the estimation means and the score output from the object detection means by using the weights which are calculated by the weighting means.

(Supplementary Note 8)

8. An object recognition method, comprising:
   estimating a possession of a person based on a pose of the person in an image;
   detecting an object from surroundings of the person in the image;
   setting weights with respect to an estimation result of the possession and a detection result of the object based on the image; and
   combining the estimation result of the possession and the detection result of the object by using the weights being set, and recognizing the possession of the person.

(Supplementary Note 9)

9. A recording medium storing a program, the program causing a computer to perform a process comprising:
   estimating a possession of a person based on a pose of the person in an image;
   detecting an object from surroundings of the person in the image;

setting weights with respect to an estimation result of the possession and a detection result of the object based on the image; and combining the estimation result of the possession and the detection result of the object by using the weights being set, and recognizing the possession of the person.

While the disclosure has been described with reference to the example embodiments and examples, the disclosure is not limited to the above example embodiments and examples. It will be understood by those of ordinary skill in the art that various changes in form and details may be made therein without departing from the spirit and scope of the present disclosure as defined by the claims.

DESCRIPTION OF SYMBOLS 2, 122, 122x Possession estimation unit
3, 123 Object detection unit
4, 124 Weighting unit
5, 125 Combination unit
6 Optimization unit
12 Processor
15 Database
100, 100x, 110, 110x Object recognition device
121 Human area detection unit
126 Correct answer label storage unit
127 Loss calculation unit
128 Parameter correction unit

What is claimed is:

1. An object recognition device comprising:
a memory storing instructions; and
one or more processors configured to execute the instructions to:
capture, using a processor, an image;
process the image to estimate a possession of a person based on a pose of the person in the image;
detect an object from surroundings of the person in the image;
set weights with respect to an estimation result of the possession and a detection result of the object based on the image; and
combine the estimation result of the possession and the detection result of the object by using the weights being set, and recognize the possession of the person.

2. The object recognition device according to claim 1, wherein the one or more processors generate pose information indicating respective positional relationships among a plurality of parts of a body which define the pose of the person, and estimates the possession of the person using the pose information.

3. The object recognition device according to claim 2, wherein the pose information corresponds to a set of positional coordinates of the plurality of parts of the body or a set of vectors indicating the positional relationships among the plurality of parts of the body.

4. The object recognition device according to claim 2, wherein the one or more processors are further configured to detect a person area in the image, wherein the one or more processors estimate the possession of the person based on the pose of the person in the person area,
the one or more processors detect the object in the person area, and
the one or more processors set the weights based on h image of the person area.

5. The object recognition device according to claim 2, wherein
the one or more processors detect the pose of the person and a person area from the image,
the one or more processors detect the object in the person area; and
the one or more processors set the weights based on the image of the person area.

6. The object recognition device according to claim 5, wherein one or more processors set the weights based on the image of the person area and the pose information.

7. The object recognition device according to claim 1, wherein
the one or more processors output, as the estimation result, a score indicating a likelihood that the possession is a predetermined object,
the one or more processors output, as the detection result, a score indicating a likelihood that the object is a predetermined object; and
the one or more processors add the score output as the estimation result and the score output as the detection result by using the calculated weights.

8. An object recognition method comprising:
capturing, using a processor, an image;
processing, using the processor, the image to estimate a possession of a person based on a pose of the person in the image;
detecting, using the processor, an object from surroundings of the person in the image;
setting, using the processor, weights with respect to an estimation result of the possession and a detection result of the object based on the image; and
combining, using the processor, the estimation result of the possession and the detection result of the object by using the weights being set, and recognizing the possession of the person.

9. A non-transitory computer-readable recording medium storing a program executable by a computer to perform a process comprising:
capturing an image;
processing the image to estimate a possession of a person based on a pose of the person in the image;
detecting an object from surroundings of the person in the image;
setting weights with respect to an estimation result of the possession and a detection result of the object based on the image; and
combining the estimation result of the possession and the detection result of the object by using the weights being set, and recognizing the possession of the person.

* * * * *